J. W. RICE & J. FULTON.

ANTITWISTING DRAFT MEANS FOR HARROWS AND THE LIKE.

APPLICATION FILED MAR. 3, 1911.

Reissued Jan. 9, 1912. 13,357.

Witnesses.

J. W. Taylor.

Harry Stine

Inventors.

JONATHAN W. RICE and JOHN FULTON.

By Chas. H. La Ponte

Atty.

UNITED STATES PATENT OFFICE.

JONATHAN WILLIS RICE AND JOHN FULTON, OF KING CITY, MISSOURI.

ANTITWISTING DRAFT MEANS FOR HARROWS AND THE LIKE.

13,357. Specification of Reissued Letters Patent. Reissued Jan. 9, 1912.

Original No. 891,953, dated June 30, 1908, Serial No. 410,822. Application for reissue filed March 3, 1911. Serial No. 612,155.

*To all whom it may concern:*

Be it known that we, JONATHAN WILLIS RICE and JOHN FULTON, citizens of the United States, residing at King City, in the county of Gentry and State of Missouri, have invented a new and useful Antitwisting Draft Means for Harrows and the Like, of which the following is a specification.

This invention has relation to anti-twisting draft means for harrows and similar implements and consists in the novel construction and arrangement of parts as hereinafter shown and described.

The object of the invention is to provide a draft means of the character indicated which is adapted to be used with a series or gang of lister or ditching harrows. The draft means is used to connect an individual harrow member with the draft bar which is employed in common for drawing all of the harrow members. This lister harrow is designed to be used particularly in the cultivation of corn planted by the lister which forms ditches having a flat bottom approximately one foot in width and having sides converging downwardly. Each individual harrow member moves along the bottom of the ditch and is guided therein by having the sides of the harrow member contacting with the sloping sides of the ditch.

This new and improved draft means is so constructed that the harrow may freely move bodily vertically, that is, as a whole and also bodily horizontally so that it may accommodate itself to ditches of various depths and unevenness and remain approximately parallel to the bottom of the ditch, so that practically all of the teeth of each individual harrow will be in contact with the bottom of the ditch and assist in the cultivating action. By having the draft means so constructed that the harrow may freely move horizontally as a whole, the harrow may accommodate itself to ditches which are separated by greater or less distances from the adjoining ditches than is usually the case and at the same time, move in said ditches parallel thereto and not ride up the sides thereof nor turn axially therein. The draft means is held against axial movement whereby said means cannot become twisted and the harrow members cannot turn over.

Figure 1:
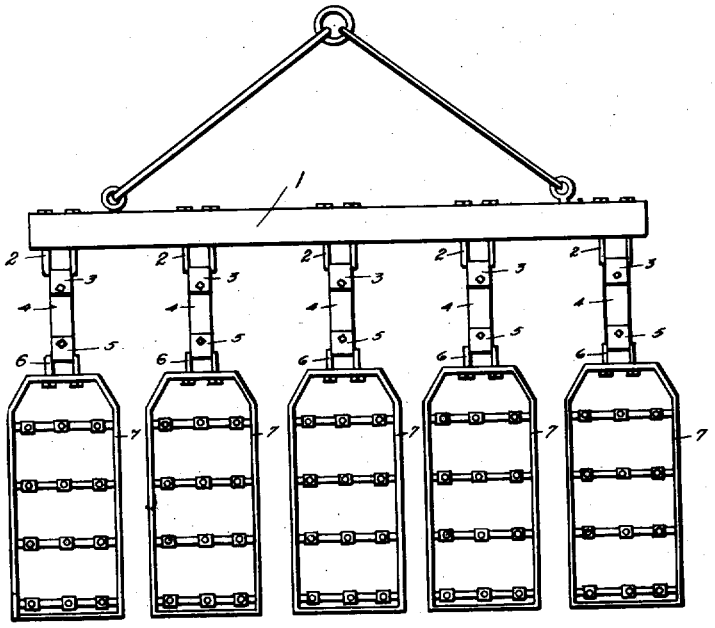
Figure 2:
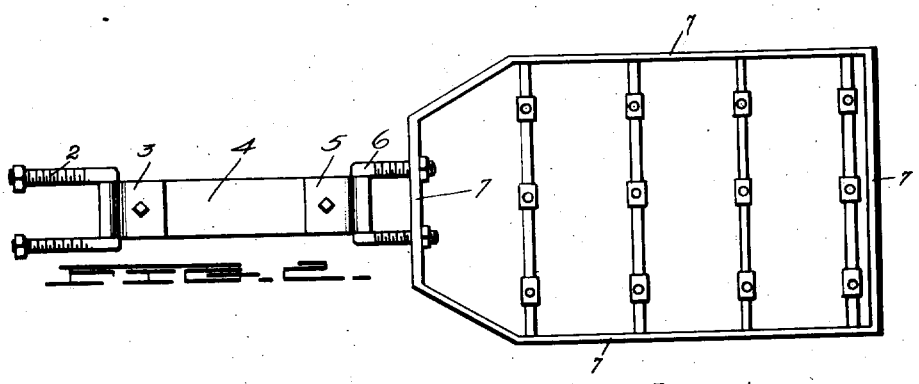

In the accompanying drawing, Figure 1 is a top plan view of a gang of harrows, each provided with a draft means. Fig. 2 is a plan view of a detached harrow member provided with a draft means.

The harrow consists of a draft bar 1 which is provided at intervals with the horizontally disposed U shaped irons or eyes 2. Loop 3 passes through each of the irons 2 allowing a vertical pivotal action between the two members. The forward end of the bar 4 is pivotally attached to said loop 3 so as to allow a horizontal movement between said members. A second loop 5 is pivoted to the rear end of each bar 4 so as to provide the second horizontal pivotal point. This loop 5 passes through a horizontally disposed pivotal eye or iron 6 which is attached to the forward end of the harrow member 7, this providing a second vertical pivotal means. It is to be noticed particularly that a draft means is provided with two pivotal connections in each direction; that is both vertically and horizontally. This allows said harrow member to move bodily as a whole, either vertically to a different plane from that in which it ordinarily works or horizontally to a different horizontal path.

Each individual harrow member will be guided in each ditch by reason of the fact that the sides of the harrow members will bear against the sides of the ditch and that the pivotal points will allow of bodily horizontal movement so that while the bar 4 will assume a position inclined at an angle to the bar 1 and the general direction of movement of the gang, each individual harrow member will remain in position parallel to said path of movement and parallel to each individual ditch in which it is working. In view of the double horizontal pivot, there will be no tendency for the harrow to ride up the sides and out of the ditch as the said pivotal connection will allow sufficient horizontal movement to retain the harrow member in the ditch. By providing the double vertical pivot, the harrow member may, as stated, accommodate itself to ditches of varying depths and have all of the teeth in contact with the bottom of the ditch in working relation thereto.

Thus it is seen that we have provided a new and improved draft means for gang lister harrows which will obviate any danger of overturning the different members and which will keep the entire harrow member in working relation with the soil at the bottom of the ditches, no matter what the depth of the ditch nor the relative distance between the adjoining ditches.

The construction is simple and inexpensive and easy to manufacture and fills a long-felt agricultural want.

Having thus described this invention, it is obvious that it serves a new, novel and necessary purpose in controlling and guiding the sections of a ditch or listing harrow.

In practice, modifications of the specific construction shown, may be made and it is to be understood that our inventive idea is not limited to the specific construction, but is defined by the appended claims, and various changes within the scope thereof may be made without disagreeing from our inventive idea.

Having thus described our invention what we claim as new and desire to secure by Letters Patent is:—

1. In combination with a draft bar and a harrow member, eyes attached to the bar and the harrow member, loops journaled upon the eyes and a bar pivotally connected at its opposite ends to said loops.

2. In combination with a draft bar, and a harrow member, a draft means between the draft bar and the harrow member, comprising a bar having separate vertically pivoting connections and horizontally pivoting connections at each end thereof.

3. In combination with a draft bar and a harrow member, a connecting draft means between the draft bar and the harrow member, comprising a bar having a vertically pivoting and also a separate horizontally pivoting connection with said draft bar, and having a vertically pivoting and also a separate horizontally pivoting connection with said harrow member.

4. In combination with a draft bar and a harrow member, a connecting draft means between the draft bar and the harrow member comprising members each vertically pivoted to said draft bar and said harrow member, and a bar horizontally pivoted to each of said vertically pivoted members.

5. In combination with a draft-bar and a harrow member, a draft means between the draft-bar and harrow member having a vertical pivot and a horizontal pivot at each end so constructed as to allow said draft means to swing freely in a horizontal direction and a vertical direction at each end without turning axially relatively to said draft-bar.

6. In combination with a draft-bar and a harrow member, a draft means between the draft-bar and harrow member and so connected to the draft-bar and harrow member as to have a free vertical and horizontal pivotal movement at each end without turning axially relatively to said draft-bar.

7. In combination with a draft-bar and a harrow member, a bar between said draft-bar and harrow member pivotally connected to said draft-bar and harrow member so as to have a free vertical and horizontal movement at each end without turning axially relatively to said draft-bar.

JONATHAN WILLIS RICE.
JOHN FULTON.

Witnesses:
T. W. Callow,
E. G. Fisher.

Copies of this patent may be obtained for five cents each, by addressing the "Commissioner of Patents, Washington, D. C."